United States Patent [19]
Sokol et al.

[11] Patent Number: 5,748,634
[45] Date of Patent: May 5, 1998

[54] METHOD AND APPARATUS FOR IMPLEMENTING A TWO-PORT ETHERNET BRIDGE USING A SEMAPHORING TECHNIQUE

[75] Inventors: Michael A. Sokol, Rancho Cordova; Kevin D. Ketchum, Folsom, both of Calif.

[73] Assignee: Level One Communications, Inc., Sacramento, Calif.

[21] Appl. No.: 528,112

[22] Filed: Sep. 14, 1995

[51] Int. Cl.$^6$ .......................... H04L 12/46; H04L 12/66
[52] U.S. Cl. ........................................ 370/402; 370/447
[58] Field of Search ................................. 370/258, 389, 370/400, 401, 402, 403, 404, 405, 406, 445, 447, 462; 340/825.05, 825.52; 395/200.13, 200.15, 200.21

[56] References Cited

U.S. PATENT DOCUMENTS

| | | | |
|---|---|---|---|
| 4,063,220 | 12/1977 | Metcalfe et al. | 340/825.5 |
| 4,099,024 | 7/1978 | Boggs et al. | 370/293 |
| 4,154,985 | 5/1979 | Munter | 370/545 |
| 4,951,280 | 8/1990 | McCool et al. | 370/402 |
| 5,058,109 | 10/1991 | Goldberg et al. | 370/401 |
| 5,079,764 | 1/1992 | Orita et al. | 370/403 |
| 5,136,580 | 8/1992 | Videlock et al. | 370/403 |
| 5,136,582 | 8/1992 | Firoozmand | 370/400 |
| 5,245,606 | 9/1993 | DeSouza | 370/401 |
| 5,249,183 | 9/1993 | Wong et al. | 370/228 |
| 5,343,471 | 8/1994 | Cassagnol | 370/401 |
| 5,345,447 | 9/1994 | Noel | 370/362 |
| 5,436,902 | 7/1995 | McNamara et al. | 370/447 |

FOREIGN PATENT DOCUMENTS 0 551 242  7/1993  European Pat. Off. .

OTHER PUBLICATIONS

"T7202 Smart Hub Controller (SHC)", Preliminary Data Sheet, Sep., 1992, AT&T Microelectronics.

"DP83955/D83956 LitE End Repeater Interface Controller (LERIC™)" Preliminary, May, 1992, National Semiconductor.

"DP83950A Repeater Interface Controller (RIC)" Preliminary, Sep., 1991, National Semiconductor.

Tugal, Dogan A., Tugal, Osman, "Chapter 12 Local–Area Networks", *Data Transmission*, 2d ed., McGraw–Hill Book Company, 1989, pp. 389–408.

(List continued on next page.)

*Primary Examiner*—Alpus H. Hsu
*Attorney, Agent, or Firm*—Merchant, Gould, Smith, Edell, Welter & Schmidt, P.A.

[57] ABSTRACT

A method and apparatus for implementing a two-port Ethernet bridge using a semaphoring technique. The Ethernet bridge includes two MAC devices, a bus, a memory and a semaphoring scheme. The controllers include a first address which is used for indicating receipt of the packet and a second address which is used for indicating the transmission of the packet from the memory and for clearing of the memory location of the packet for further use. The receiving media access controller receives a data packet on a first port and the transmitting media access controller transmits the packet from the memory to a second port associated with the address of the intended user designated by the packet. The memory includes a dual-ring structure, with one ring used for receive traffic and the other ring used for transmit traffic. The MACs also include programmability for designating the type of packets that may be received. Thus, a particular address on the bus is uniquely designated to carry each message and the address on the bus is independent of the source of the message.

28 Claims, 4 Drawing Sheets

OTHER PUBLICATIONS

Shotwell, Robyn E., "The Ethernet Sourcebook", Elsevier Science Publishing Company, New York, NY, 1985, pp. 281–286.

Linge, N. et al., "Bridge architecture, performance and management", Second IEE National Conference On Telecommunications, University of Salford, UK, Apr. 2–5, 1989, pp. 277–281.

Santana, M.J. et al, "Fast bridge for efficient LAN–LAN coupling", IEE Proceedings–E/Computers and Digital Techniques, Stevenage, Herts., GB, Sep. 5, 1988, vol. 135, pp. 273–277.

METHOD AND APPARATUS FOR IMPLEMENTING A TWO-PORT ETHERNET BRIDGE USING A SEMAPHORING TECHNIQUE

BACKGROUND OF THE INVENTION

1. Field of the Invention

This invention relates in general to a two-port Ethernet bridge, and more particularly, to a two-port Ethernet bridge utilizing semaphoring techniques for communicating between two Media Access Control devices.

2. Description of Related Art

Recent advancements in the art of data communications have provided great strides in resource sharing amongst computer systems through the use of networks which offer reliable high-speed data channels. Networks allow versatility by defining a common standard for communication so that information independent of vendor equipment may be exchanged across user applications. As the popularity of networks increase so does the demand for performance. More sophisticated protocols are being established to meet this demand and are utilizing existing twisted pair cables in office buildings so that virtually all computer literate users have access to resources with minimal expense.

The standard for Local and Metropolitan Area Network technologies is governed by IEEE Std. 802. IEEE Std. 802 describes the relationship among the family of 802 standards and their relationship to the ISO Open System Interconnection Basic Reference Model and is herein incorporated by reference. Generally, IEEE Std. 802 prescribes the functional, electrical and mechanical protocols, and the physical and data link layers for Local and Metropolitan Area Networks (LAN/MAN). The specification augments network principles, conforming to the International Standards Organization (ISO) seven-layer model for open systems interconnection (OSI), commonly referred to as "Ethernet". In the hierarchy of the seven-layer model, the lowest layers, the so-called physical and data link layers, comprise functional modules that specify the physical transmission media and the way network nodes interface to it, the mechanics of transmitting information over the media in an error-free manner, and the format the information must take in order to be transmitted.

In an Ethernet network, a Media Access Controller converts digital information, typically stored in memory in the form of a packet, into an actual Ethernet frame which can be transmitted onto an Ethernet connection and vice-versa. Thus, users within a group can receive and transmit messages and route data between themselves. However, it is often desirable to communicate and pass data between two users who are not within the same collision domain. In this situation, the two users must be bridged together.

An Ethernet bridge is a device with two or more physical ports that is capable of forwarding a packet received on any port to any other single port based on the destination address of the packet. A packet that is not forwarded to a port is considered filtered.

There have been many schemes for providing the bridging functionality between two such users. The most common involves using a CPU, memory and a bus to tie two independent Media Access Control devices (MACs) together. Each Media Access Controller device sends and receives date packets to a structure in memory that is specifically allocated to that Media Access Controllers via the bus. The CPU is used to shuttle (copy) data from one memory structure to another, or at least to coordinate the two devices so that they can communicate with each other. Either case is costly because first of all software must be developed for the CPU and secondly having to have the CPU act as intermediary necessarily slows down the process and reduces the transfer rate. Compensating for this requires the use of very fast and therefore costly CPU's.

It can be seen that there is a need for an Ethernet bridge which allows two Media Access Controllers devices to pass data between turn with minimal CPU intervention.

It can also be seen that there is a need for Ethernet bridges which require intervention for merely performing initialization of the two devices such that once the initialization is complete, the two devices should be able to communicate with no CPU intervention.

It can also be seen that there is a need for an Ethernet bridge which minimizes software development, eliminates CPU bottlenecks, and allows integration of high performance bridge devices without high-speed, high-cost CPU's.

SUMMARY OF THE INVENTION

To overcome the limitations in the prior art described above, and to overcome other limitations that will become apparent upon reading and understanding the present specification, the present invention discloses a method and apparatus for implementing a two-port Ethernet bridge using a semaphoring technique.

The present invention solves the above-described problems by providing two MAC devices, an intervening bus, a memory, and a semaphoring scheme whereby either device can inform the other that it has received a new packet and placed it into memory.

A system in accordance with the principles of the present invention comprises a receiving media access controller, at least one transmitting media access controller, a memory, a bus, and two unique address locations. The receiving media access controller receives a data packet on a first port. The receiving Media Access Controllers places the packet into structure in memory (by performing an access cycle on the bus). The receiving Media Access Controller then indicates the presence of that packet to the transmitting Media Access Controllers by performing (executing) a bus cycle to one of the (the first) unique address(es). Subsequently the transmitting Media Access Controllers device transmits that packet to users attached to its ports. The transmitting Media Access Controllers then signals back to the receiving Media Access Controllers that the packet has been transmitted and that the space in memory which it occupied is now available, by executing a bus cycle to the other (second) unique address. The receiving Media Access Controllers is now free to use that space for new packets that it may receive.

The two unique addresses that are used by the Media Access Controllers to communicate with each other are programmed into registers on each device.

By building the memory structure as a ring, and by defining a register known as the "Write Boundary" register the two Media Access Controllers are able to pass packets back and forth indefinitely. Each new packet is put into the ring just after the previously received packet. The Write Boundary register indicates the point in the ring past which packets previously received by the first Media Access Controllers have not yet been transmitted by the second Media Access Controller. Whenever the transmitting Media Access Controllers signals that it has transmitted a packet back to the receiving Media Access Controllers, it also updates the Write Boundary register of the receiving Media Access Controller. This is done by transmitting the valve of the Write Boundary register during the data portion of the bus cycle.

One aspect of the present invention is that bus cycles consisting of an address phase and a data phase are used to transmit the messages.

Another aspect of the present invention is that a particular address on the bus is uniquely designated to carry each message.

Another aspect of the present invention is that the address on the bus designated for the intercommunication function (semaphores) is independent of the source of the message.

Yet another aspect of the present invention is that the address is not used for any other purpose by any device on the bus.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a two-port ethernet bridge utilizing semaphoring techniques for communicating between two Media Access Control devices.

Figure 1:
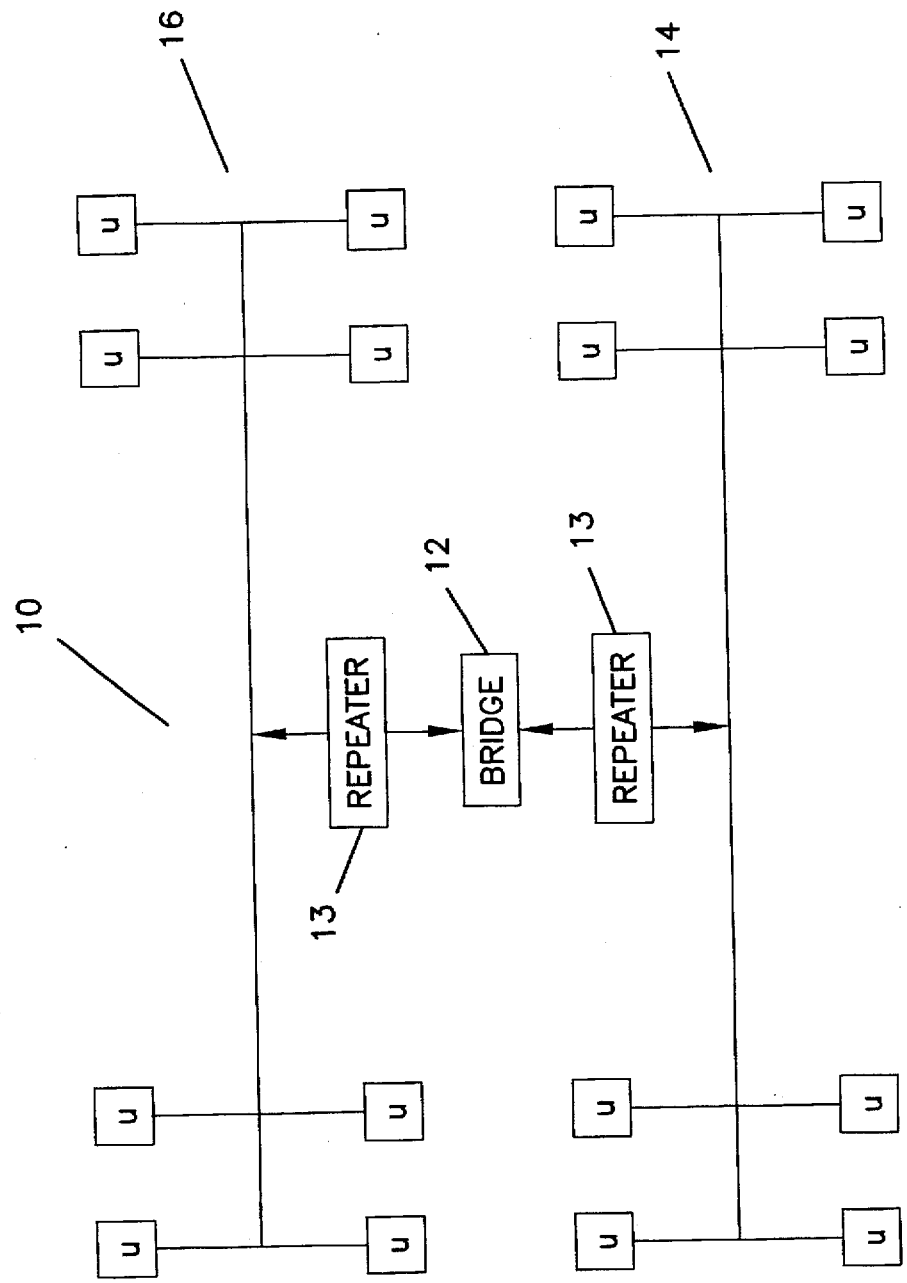
FIG. 1 is a system block diagram of a bridge connecting two groups of users according to the present invention.

FIG. 1 illustrates a system 10 utilizing a bridge 12 according to the present invention. The bridge 12 connects through repeaters 13 one group of users 14 to a second group of users 16. Each set of users constitutes a single collision domain. Alternatively, multiple groups of users may be connected via a backbone/bridge arrangement. In FIG. 1, the group of users in the first collision domain 14 can receive and transmit messages and route data between themselves. However, it is often desirable to communicate and pass data to users in a second collision domain 16 which is different from the first collision domain. Thus, a bridge 12 according to the present invention is needed to route packets to the proper destination address.

Figure 2:
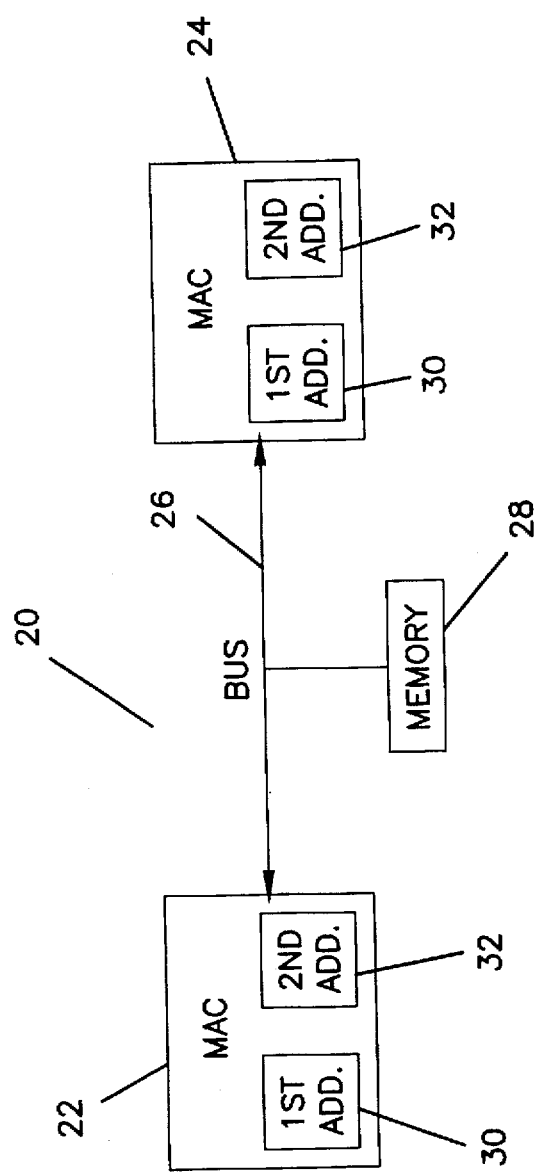
FIG. 2 illustrates an block diagram of a two-port bridge according to the present invention.

FIG. 2 illustrates an exemplary system 20 according to the present invention. The bridge 20 includes two media access control devices 22, 24, a bus 26 and a storage or memory device 28. Each MAC provides one-side of a two-port bridge system. The MACs also include programmability for governing the type of packets that may be received (not shown). All other packets will be filtered.

The receiving media access controller 22 receives a data packet on a first port. The packet's designation indicates a user who's address is unassociated with users attached to the receiving media access controller 22. The transmitting media access controller 24 has a second port associated with the address of the intended user designated by the packet. The bus 26 interconnects the receiving 22 and transmitting 24 devices so that the packet may be stored in a memory 28 coupled to the bus 26. For the bridge application 20, the MACs 22, 24 share a pair of Forward Transmit and Receive rings in memory 28, which have their own set of control registers. The rings will be discussed more fully with respect to FIG. 3 and 4 below. Further, a first unique address 30 is programmed into the receiving 22 and transmitting 24 media access controllers and is used to indicate receipt of the packet. A second unique address 32 is programmed into the receiving 22 and transmitting 24 media access controllers and is used to indicate the transmission of the packet from the memory 28 to the user designated by the packet (not shown) and to clear the memory 28 for further use. However, the designation of one of the controllers as receiving and the other as transmitting is for illustration only and is not meant to limit the invention. Those skilled in the art will recognize that the functions of receiving and transmitting could be performed by either MAC.

Figure 3:
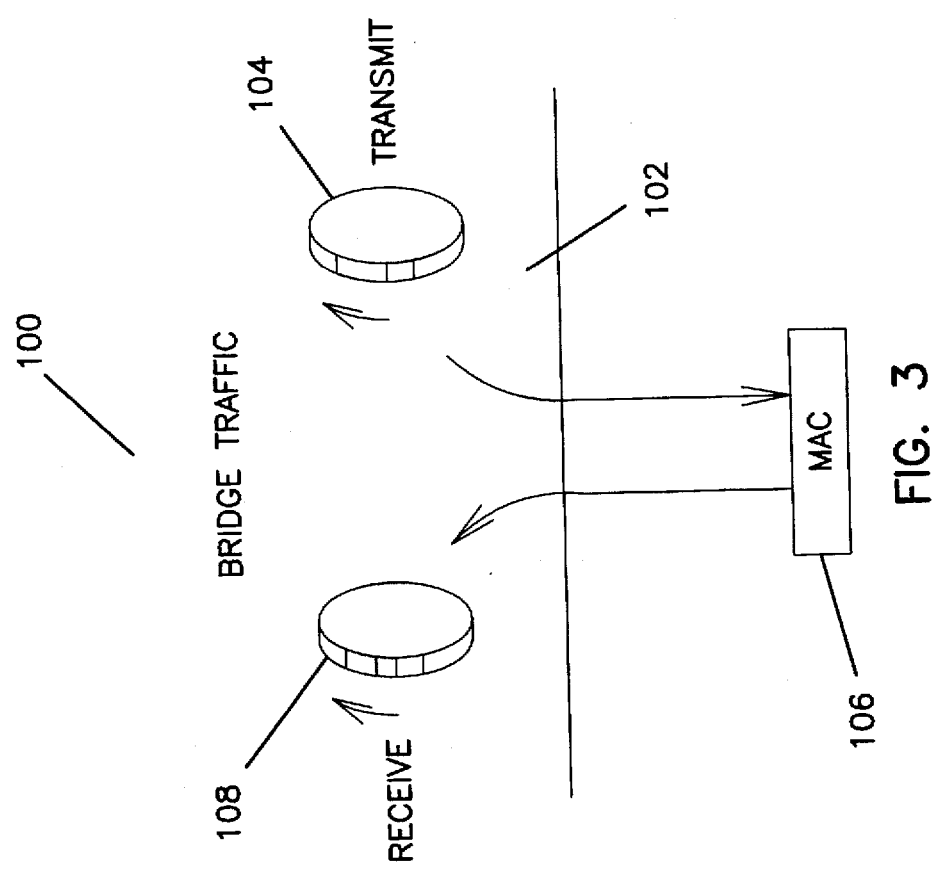
FIG. 3 illustrates a dual-ring structure for the memory of FIG. 2 according to the present invention.

FIG. 3 illustrates a dual-ring structure 100 for the memory 102. The present invention provides movement of packets directly to and from memory 102 with no CPU overhead. Packet memory is organized as a dual-ring structure, with one ring used for receive traffic 104 from a MAC 106 and the other ring used for transmit traffic 108 to a MAC 106.

When the MAC receives a packet, it places it in the receive ring, along with an 8-byte header and CRC. This header consists of a control byte, a pointer to the next packet, a status byte and the packet length. Packets to be transmitted must first be loaded in the transmit ring. Again each packet must be preceded by an 8-byte header. The header has the same format as that for a receive packet. Multiple packets can be chained together using two bits in the control byte. The CRC can either be loaded as part of each packet, or generated by the MAC, and is controlled on a packet-by-packet basis through a third bit in the control byte.

Figure 4:
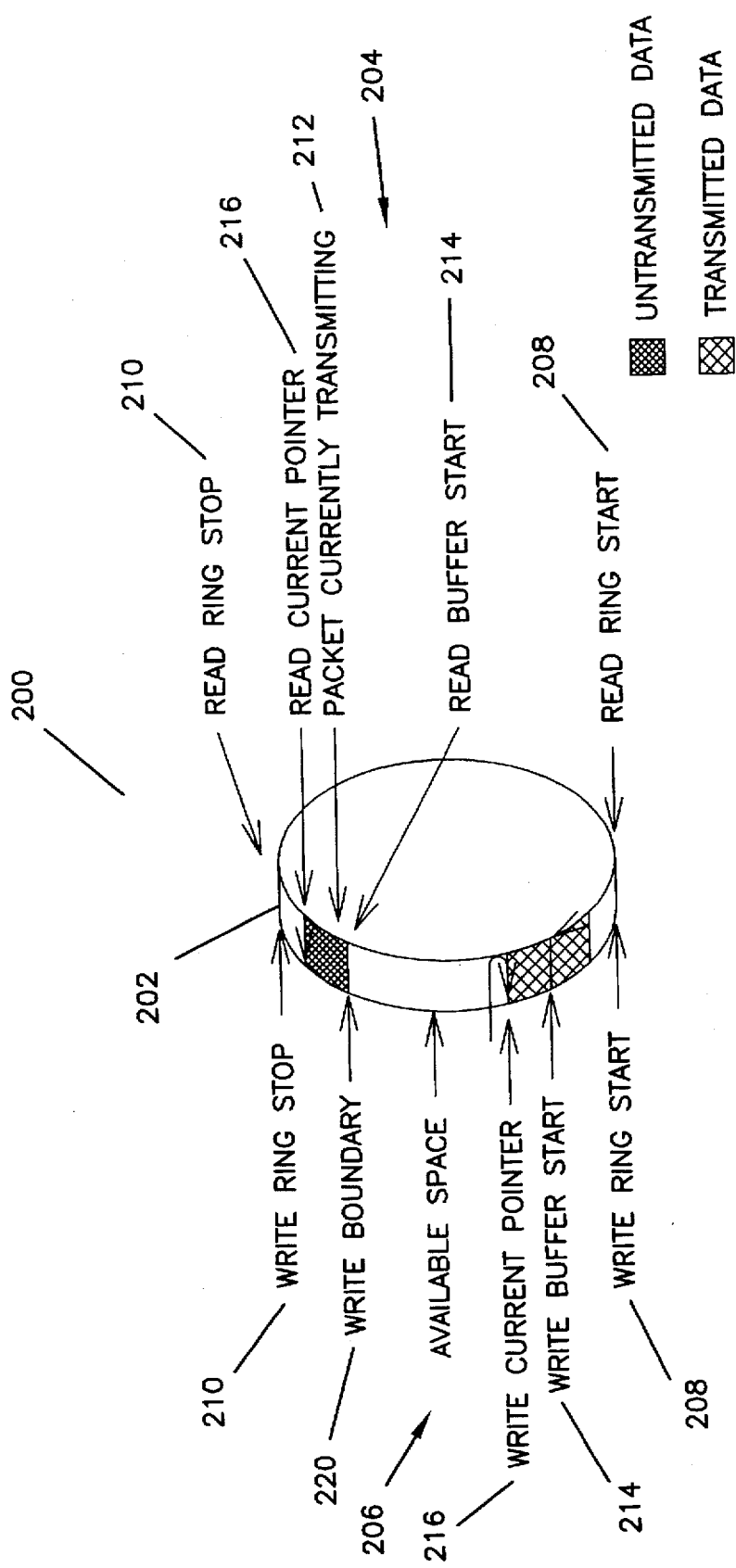
FIG. 4 illustrates the operation of the transmit ring structure according to the present invention.

FIG. 4 illustrates the operation of a ring structure 200 by more specifically illustrating the operation of a transmit ring 202. Those skilled in the art will recognize that the operation of a receive ring will proceed similarly to that of a transmit ring. The read functions 204 will be illustrated along with the write functions 206. The read functions 204 will be discussed first.

The ring 202 is controlled through a set of 6 registers. The Start 208 and Stop 210 Registers locate the ring 202 in memory. When the Ring Stop 210 boundary is reached, the current packet 212 is completed and the ring 202 wraps back to the start 208.

The Buffer 214, Start 208, Current 216 and Next 218 pointers are used during packet processing, and they should be initialized to point to the first packet to be transmitted. The Buffer pointer 214 points to the start of the current buffer. The Buffer pointer 214 register allows quick recovery of the pointers when a packet is rejected if for a receiving ring and facilitates collision retry if for a transmitting ring.

The Next pointer 218 points to the address of the next buffer to be processed. To provide a clear explanation of the ring, only one buffer is illustrated. Thus, the Next pointer 218 is not shown in FIG. 4. The Current pointer 216 points to the address which is currently being accessed. The Page address (not shown) controls the upper memory address bits (i.e., global location of the ring in memory) during DMA access.

The write functions are defined similarly to the read functions except the write functions has one additional register, the Write Boundary register 220. The Write Boundary 220 defines a boundary that the receive DMA cannot cross. If the Write Boundary 220 is reached, packets will be discarded, and interrupts and status will be generated. If the receiver reaches the Write Boundary 220 while receiving a packet, it terminates packet reception and sets a bit in an Interrupt Status Register in the MAC. However, it does not stop operation, and continues to attempt to receive packets to the ring.

If the Write Boundary is placed outside the bounds defined by the ring start 208 and stop 210 registers, the receiver will continuously receive all packets to the ring, overwriting previously received packets even if they have not been read by the second MAC. The area 222 between the Write Current pointer 216 and the Write Boundary 220 is space available for additional packets.

If the receiver reaches the Stop Boundary 210 while receiving the packet, it completes reception of the packet even if it has to write beyond the stop address, then resets its pointers back to the Start 208 of the ring. A predetermined amount of unused memory is allocated beyond the boundary of the receive ring. An ownership bit in the status byte of the packet header is used to indicate the read/write status of a packet. The receiver always sets this bit to 1, the transmitter to 0.

The transmitter and receiver work independently, each has a 64 byte FIFO internal to the MAC. Thus the MACs support full duplex Ethernet operation.

Once initialized, the MAC transmitter and receiver functions continue to operate without further intervention. There are only two conditions which can cause a fatal error: a transmit FIFO underflow or a receive FIFO overflow. Either condition requires an external device to re-initialize the rings and re-start the operation. Either condition is evidence of a serious problem (insufficient bus bandwidth or incorrect latency settings).

Each MAC supplies an automatic filtering function for packets going into the Forward Receive Ring. Only non-errored, valid-length packets that meet one of the following conditions are written to the Forward Receive Ring: (1) Broadcast Packets or Multicast Packets or (2) Unicast packets that do not match the MAC address or any local source address, provided that a designated "local" pin is not asserted. The "local" pin is used by the MAC in an auxiliary way. In extended (cascaded) designs with many ports and multiple management devices, the local pin is used to indicate that the incoming packet is local to them (i.e. matches a source addresses on one of their ports) and therefore should not be forwarded.

In summary, the MAC provides a semaphoring function which is used to implement the two-port bridge with low CPU overhead. To use this function, the host processor must reserve a block of 32 locations somewhere in the address space of the CPU bus and enable the function. Whenever a MAC completes the reception of a packet to the forward ring, it acquires ownership of the bus and signals a "New Packet" semaphore to its companion device using a pre-assigned address in the semaphore address region. Similarly, whenever a MAC completes transmission of a packet from the forward ring, it signals a "Write Boundary Changed" semaphore using a different address within the region. As a bus master, the MAC supports both 16- and 32-bit transfers, and performs all transfers in non-burst mode.

To enable low-cost two-port bridging, the host processor must allocate an area of memory to both the Receive Forward Ring of the MAC and to the Transmit Forward Ring of the companion MAC device. The Receive Forward Ring and the Transmit Forward Ring must overlap. Further, the host processor must do the same with the Transmit Forward Ring of a MAC and the Receive Forward Ring of the companion MAC device. The semaphore address space of both devices must be set to the same address space. Finally, the forwarding and semaphoring on both devices must be enabled. Once the MAC devices are initialized by a CPU, they operate independently, with very little overhead, thus achieving a very low-cost workgroup bridging function.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A bridging device for routing packets between a receiving port and a destination port, comprising:

a receiving media access controller, the receiving media access controller receiving a data packet on a first port, the packet intended for a user with an address unassociated with users attached to the receiving media access controller;

at least one transmitting media access controller, the at least one transmitting media access controller having a second port, the second port associated with the address of the intended user designated by the packet being received on the first port;

a bus, disposed between the receiving and transmitting media access devices, for interconnecting the receiving and transmitting media access controllers;

a memory, coupled to the bus, for providing a common data structure for storing data packets received by the receiving media access controller prior to transmission by the transmitting media access controller;

a first unique address, programmed into the receiving and transmitting media access controllers, a receiving media access controller signaling to the first unique address in the transmitting media access controller to indicate receipt of a packet for transmission; and a second unique address, programmed into the receiving and transmitting media access controllers, a transmitting media access controller signaling to the second unique address in the receiving media access controller to indicate transmission of the packet.

2. The bridging device of claim 1 wherein the receiving and the transmitting media access controllers operate independently.

3. The bridging device of claim 1 wherein the memory further comprises a dual-ring structure, with one ring used for receive traffic and the other ring used for transmit traffic.

4. The bridging device of claim 3 wherein the address in one of the media access controllers used for indicating receive traffic must be set to be the same as the address in the other media access controller used for transmit traffic.

5. The bridging device of claim 3 wherein the ring used for receive traffic further comprises a write boundary for setting a limit that the receiver can not overwrite.

6. The bridging device of claim 5 wherein the writing of data into the second unique address informs the receiving media access controller of changes in the write-boundary.

7. The bridging device of claim 1 wherein the first unique address must be designated the same for the receiving and transmitting media access controllers.

8. The bridging device of claim 7 wherein the second unique address must be designated the same for the receiving and the transmitting media access controllers.

9. The bridging device of claim 1 wherein the receiving and the transmitting media access controllers further comprise means for identifying types of packets that may be received and means for controlling whether packets are received.

10. The bridging device of claim 9 further comprising a filtering means coupled to the controlling means for determining acceptable packets and rejecting unacceptable packets.

11. A bridging device for forwarding packets received on a first port to a second port, comprising:

a first media access controller receiving a data packet intended for a user with an address unassociated therewith;

a second media access controller having a user with the intended address;

a bus, disposed between the first and second media access controllers, for interconnecting the first and second media access controllers;

a memory, coupled to the bus, for providing a common data structure for storing data packets received by the first and second media access controller; and a semaphore communication scheme, shared by the first and second media access controllers, for signaling to the second media access controller that a packet has been received by the first media access controller and is stored in the memory, and for signalling by the second media access controller to the first media access controller after transmission of the stored packet that the packet in the memory has been transmitted.

12. The bridging device of claim 11 wherein the first and second media access controllers operate independently.

13. The bridging device of claim 11 wherein the memory further comprises a dual-ring structure, with one ring used for receive traffic and the other ring used for transmit traffic.

14. The bridging device of claim 13 wherein the address in the first media access controllers used for receive traffic must be set to be the same as the address in the second media access controller used for transmit traffic.

15. The bridging device of claim 13 wherein the ring used for receive traffic further comprises a write boundary for setting a limit that the receiver can not overwrite.

16. The bridging device of claim 15 wherein the writing of data into the second unique address informs the first media access controller of changes in the write-boundary.

17. The bridging device of claim 13 wherein the receive traffic and transmit traffic rings further comprise a stop boundary and a start boundary, the receive process finishes receiving the current packet and wraps to the start boundary for the next packet when the stop boundary is reached.

18. The bridging device of claim 17 wherein the receiving media access controller uses memory past the stop boundary when the length of the received packet necessitates.

19. The bridging device of claim 11 wherein the first and second media access controller further comprises means for identifying types of packets that may be received and means for controlling whether packets are received.

20. The bridging device of claim 19 further comprising a filtering means coupled to the controlling means for determining acceptable packets and rejecting unacceptable packets.

21. The bridging device of claim 11 wherein the communication scheme for signaling to the second media access controller that a packet has been received by the first media access controller and is stored in the memory further comprises a first unique address, writing to the first unique address indicating the receipt of a packet for transmission.

22. The bridging device of claim 21 wherein the communication scheme for signalling by the second media access controller to the first media access controller that the packet in memory has been transmitted further comprises a second unique address, writing to the second unique address indicating the transmission of the packet in the memory location.

23. The bridging device of claim 11 wherein the communication scheme for signalling by the second media access controller to the first media access controller that the packet in memory has been transmitted further comprises a second unique address, writing to the second unique address indicating the transmission of the packet in the memory location.

24. The bridging device of claim 23 wherein the first unique address must be designated the same for both the first and second media access controllers.

25. The bridging device of claim 24 wherein the second unique address must be designated the same for both the first and second media access controllers.

26. A method of transferring a packet received on a port of a first media access controller to a port on a second media access controller, comprising the steps of:

receiving on a port of the first media access controller a packet having a destination address associated with a port of the second media access controller;

storing the packet in a memory attached to a bus, the memory and the bus being shared by the first media access controller and the second media access controller;

signaling by the first media access controller to a first unique address in the second media access controller that a packet has been received and is stored in the memory;

transmitting the packet in memory to the destination address by the second media access controller;

signaling by the second media access controller to a second unique address in the first media access controller that the packet has been transmitted.

27. The method of claim 26 wherein the step of signaling by the second media access controller further comprises the step of indicating to the first media access controller that the memory location occupied by the transmitted packet is free for use by other received packets.

28. The method of claim 26 further comprising the steps of identifying types of packets that may be received, determining whether received packets are acceptable, and rejecting unacceptable packets.

* * * * *